United States Patent [19]
Comrie

[11] Patent Number: 5,820,668
[45] Date of Patent: Oct. 13, 1998

[54] INORGANIC BINDER COMPOSITION, PRODUCTION AND USES THEREOF

[75] Inventor: Douglas C. Comrie, Milton, Canada

[73] Assignee: IB Technologies LLC, Barbados

[21] Appl. No.: 578,874

[22] Filed: Dec. 22, 1995

[51] Int. Cl.⁶ .................................................. C04B 7/14
[52] U.S. Cl. ........................ 106/600; 106/624; 106/692; 106/705; 106/714; 106/789; 106/801; 106/DIG. 1
[58] Field of Search ................................... 106/600, 624, 106/692, 705, 714, 745, DIG. 1, 789, 800, 801

[56] References Cited

U.S. PATENT DOCUMENTS

| | | |
|---|---|---|
| 2,304,391 | 12/1942 | Zimmerman . |
| 3,202,522 | 8/1965 | Yang et al. . |
| 3,804,650 | 4/1974 | Meissner et al. . |
| 3,950,470 | 4/1976 | Davidovits . |
| 4,000,027 | 12/1976 | Dalle et al. . |
| 4,028,454 | 6/1977 | Davidovits et al. . |
| 4,063,944 | 12/1977 | Behring ........................ 75/256 |
| 4,132,558 | 1/1979 | Uchikawa et al. ...................... 106/696 |
| 4,208,217 | 6/1980 | Anderson et al. . |
| 4,306,912 | 12/1981 | Forss . |
| 4,349,386 | 9/1982 | Davidovits ............................... 106/626 |
| 4,472,199 | 9/1984 | Davidovits ............................... 106/600 |
| 4,504,320 | 3/1985 | Rizer et al. ............................... 106/709 |
| 4,509,985 | 4/1985 | Davidovits et al. ..................... 106/624 |
| 4,522,652 | 6/1985 | Neuschaeffer et al. ................. 106/626 |
| 4,533,393 | 8/1985 | Neuschaeffer et al. .............. 106/18.12 |
| 4,608,795 | 9/1986 | Neuschaeffer et al. ................. 106/626 |
| 4,640,715 | 2/1987 | Heitzmann et al. ..................... 106/709 |
| 4,642,137 | 2/1987 | Heitzmann et al. ..................... 106/607 |
| 4,859,367 | 8/1989 | Davidovits ............................... 106/600 |
| 4,888,311 | 12/1989 | Davidovits et al. ...................... 501/95 |
| 4,906,408 | 3/1990 | Bouniol ................................... 106/695 |
| 4,915,740 | 4/1990 | Sakai et al. . |
| 4,933,013 | 6/1990 | Sakai et al. ........................ 106/DIG. 1 |
| 4,943,544 | 7/1990 | McGarry et al. . |
| 5,288,321 | 2/1994 | Davidovits . |
| 5,342,595 | 8/1994 | Davidovits et al. ..................... 423/332 |
| 5,349,118 | 9/1994 | Davidovits ............................... 106/707 |
| 5,352,427 | 10/1994 | Davidovits et al. ..................... 423/332 |
| 5,372,640 | 12/1994 | Schwarz et al. ......................... 106/705 |
| 5,395,441 | 3/1995 | Hogdan et al. .......................... 106/714 |
| 5,453,103 | 9/1995 | Ford . |
| 5,531,824 | 7/1996 | Burkes et al. ............................ 106/705 |
| 5,565,026 | 10/1996 | Hense et al. ............................. 106/713 |
| 5,569,324 | 10/1996 | Totten et al. ............................. 106/708 |
| 5,624,491 | 4/1997 | Liskowitz et al. ....................... 106/705 |

FOREIGN PATENT DOCUMENTS

| | | |
|---|---|---|
| 495336 | 10/1991 | European Pat. Off. . |
| 2659319 | 3/1990 | France . |
| 2666328 | 9/1990 | France . |
| 2666328 | 3/1992 | France . |
| 2709258 | 8/1993 | France . |
| 2709258 | 3/1995 | France . |
| 2055919 | 3/1996 | U.S.S.R. . |
| 8802741 | 4/1988 | WIPO . |
| PCT/CA96/ 00846 | 12/1996 | WIPO . |

OTHER PUBLICATIONS

Geopolymer '88, vol. 1, pp. 107–124, Geopolymer Technologies in Toxic Waste Management, Douglas C. Comrie et al. (1988) no month available.

*Primary Examiner*—Paul Marcantoni
*Attorney, Agent, or Firm*—Renner, Otto, Boisselle & Sklar

[57] ABSTRACT

An inorganic binder composition has a first constituent which is a poly(sialate) or a poly(sialate-siloxo) admixed with a second constituent which has one or more of: fly ash F, fly ash C, fumed silica, $Al_2O_3$, pozzolan, ground slag, nephelene cyanite, anhydrous aluminum silicate, hydrous aluminum silicate, hydrous sodium hydroxide, silicic acid, potassium salt, and sodium salt.

15 Claims, No Drawings

INORGANIC BINDER COMPOSITION, PRODUCTION AND USES THEREOF

FIELD OF INVENTION

The invention relates to an inorganic binder composition and the production of such binder composition and the uses of such binder composition. In particular, this invention relates to an inorganic binder composition which is particularly useful in treating waste materials for recycling and safe and secure disposal.

BACKGROUND OF INVENTION

Inorganic binder compositions have been proposed to solidify and dispose harmful wastes. In the Davidovits U.S Pat. No. 5,352,427; 5,349,118; 5,342,595; 4,859,367; 4,349,386; 4,472,199; 4,509,985; 4,522,652; 4,533,393; 4,608,795; 4,640,715; 4,642,137, a geopolymer comprising alumino-silicate oxide is described. These geopolymers were developed for inclusion in masonry tiles but were found to be useful for solidifying wastes for long term disposal.

Alumino-silicate binders are comprised of two components: a fine dry powder and a syrupy, highly alkaline liquid. The powder is a soluble alkali polysilicate which can be activated by the alkaline liquid to form tetrahedra of $SiO_4$ and $AlO_4$. The tetrahedra are cross-linked by shared oxygen molecules to form inorganic polymeric networks. A mildly exothermic reaction in the alkali activated mixture is accompanied by hardening and polycondensation.

Inorganic binders are characterized by several distinct properties, including thermal stability, high surface smoothness, precise mobility and hard surfaces. As a result, inorganic binders are particularly useful in specialty construction applications, such as saline or aqueous environments.

Further, the inorganic binder compositions of the prior art have been found to provide long term solutions for hazardous and harmful wastes. Various organic and inorganic wastes can be mixed with the inorganic compounds displacing the normal volume of aggregates in forming a monolithic solid. As the crystal structure grows and the solution solidifies, the waste components are co-bound into a lattice, rendering the waste chemically inert, suitable for landfilling, recycling into construction media or reintroduction into a production process. The most significant properties of a waste treated with an inorganic binder is the ability to resist chemical attack from acidic conditions and to transform soft, disaggregated or sludge-like waste into hard, cohesive solids in a relatively short period of time.

Unfortunately, the cost of the raw materials has prevented the inorganic binder compositions of the prior art from being commercially competitive with other existing technologies for long term disposal or recycling of wastes or even with conventional Portland cement.

SUMMARY OF THE INVENTION

The disadvantages of the prior art may be overcome by providing an inorganic binder composition which is cost effective to manufacture and use.

It is desirable to provide an inorganic binder composition which is curable in a variety of environments, including saline, corrosive, acidic, toxic and radioactive.

It is desirable to provide an inorganic binder composition which is useful in treating hazardous and harmful wastes and rendering such wastes inert for long term disposal.

According to one aspect of the invention, there is provided a first constituent of an inorganic binder composition. The first constituent comprises about 20% sodium dioxide; about 60% tri-calcium silicate; about 10% di-calcium silicate; about 6% tri-calcium aluminate; about 1% aluminum oxide; about 1% ferric oxide; about 1% magnesium oxide; and about 1% sulphur tri-oxide.

According to another aspect of the invention, there is provided an inorganic binder composition comprising about 5–20% fumed silica; between 40–60% anhydrous aluminum silicate; between 1–10% silicic acid; and between 1–10% either potassium or sodium salt.

According to another aspect of the invention, there is provided an inorganic binder composition has as a first constituent a poly(sialate) or a poly(sialate-siloxo) admixed with one or more of: fly ash F, fly ash C, fumed silica, $Al_2O_3$, pozzolan, ground slag, nephelene cyanite, anhydrous aluminum silicate, hydrous aluminum silicate, hydrous sodium hydroxide, silicic acid, potassium salt, and sodium salt. The admixture has a molar ratio of $SiO_2$ to $Al_2O_3$ of between about 5.2 to about 14.3.

According to another aspect of the invention, there is provided an inorganic binder composition comprising a first constituent comprising sodium dioxide, tri-calcium silicate, di-calcium silicate, tri-calcium aluminate, aluminum oxide, ferric oxide, magnesium oxide, and sulphur tri-oxide, admixed with a second constituent selected from one or more of the following: fly ash F; fly ash C; fumed silica; $Al_2O_3$; pozzolan; ground slag; nephelene cyanite; anhydrous aluminum silicate; hydrous aluminum silicate; hydrous sodium hydroxide; silicic acid; potassium salt; and sodium salt.

According to another aspect of the invention, there is provided a method of recycling waste materials from a smelting furnace comprising the steps of: admixing revert materials of a metal smelting furnace with an inorganic binder composition, and compacting the admixture into a briquette for recycling in said furnace.

According to another aspect of the invention, there is provided a method of recycling waste materials from a smelting furnace, including coke breeze, furnace sludge, mill scale and flue dust. The method comprises the steps of: admixing the revert materials of a metal smelting furnace with 13½% to about 17½% by weight of an inorganic binder composition, and compacting the admixture into a briquette for recycling in said furnace.

DESCRIPTION OF THE INVENTION

First Embodiment

The invention relates to a binder composition as a replacement for or additive to cement. The inorganic binder composition of the first embodiment of the present invention includes a first constituent comprising by weight:

---
20% sodium dioxide;
60% tri-calcium silicate;
10% di-calcium silicate;
6% tri-calcium aluminate;
1% aluminum oxide;
1% ferric oxide;
1% magnesium oxide;
1% sulphur tri-oxide.

---

The first constituent is a poly(sialate) or a poly(sialate-siloxo). However, the composition of the first constituent of the present invention has molar ratios of components which differ from the poly(sialate) or a poly(sialate-siloxo) of the prior art.

EXAMPLE 1

Between 62 and 90%, by weight, of the first constituent of the first embodiment of the binder composition can be admixed with:

5–20% fly ash F;
4–10% fumed silica;
1–8% $Al_2O_3$.

The resulting composition has a molar ratio of $SiO_2$ to $Al_2O_3$ in the range of about 5.2 to about 7.6.

The composition of this example is useful as a construction material, either in partial substitution for or in conjunction with Portland cement. The fly ash F in combination with fumed silica acts as a Portland cement-type material when combined with $Al_2O_3$.

EXAMPLE 2

Between 60 and 90%, by weight, of the first constituent of the first embodiment of the binder composition can be admixed with:

4–10% pozzolan;
4–10% ground slag (calcium oxide);
5–10% anhydrous aluminum silicate;
1–5% silicic acid;
1–5% potassium salt.

The resulting composition has a molar ratio of $SiO_2$ to $Al_2O_3$ in the range of about 5.2 to about 8.9, of $M_2O$ to $SiO_2$ in the range of about 0.07 to about 0.11, of $H_2O$ to $M_2O$ in the range of about 5.0 to about 10.0 and of $M_2O$ to $Al_2O_3$ in the range of about 0.30 to about 0.45, where $M_2O$ is selected from the group comprising of $Na_2O$, $K_2O$ and a mixture of $Na_2O$ and $K_2O$.

The composition of this example is particularly useful for hazardous waste applications. The anhydrous aluminum silicate provides the building block for the zeolite structure when it combines with the silicic acid and potassium salt. Additional crystal structure is provided by the calcium silicate bonds. The bonding effectively encapsulates the molecules of the hazardous materials.

EXAMPLE 3

Between 60 and 90%, by weight, of the first constituent of the first embodiment of the binder composition can be admixed with:

4–10% pozzolan;
4–10% ground slag;
5–10% anhydrous aluminum silicate;
1–5% silicic acid;
1–5% sodium salt.

The resulting composition has a molar ratio of $SiO_2$ to $Al_2O_3$ in the range of about 5.2 to about 8.9, of $M_2O$ to $SiO_2$ in the range of about 0.07 to about 0.11, of $H_2O$ to $M_2O$ in the range of about 5.0 to about 10.0 and of $M_2O$ to $Al_2O_3$ in the range of about 0.30 to about 0.45.

The composition of this example is also useful for hazardous waste applications.

EXAMPLE 4

Between 60 and 90%, by weight, of the first constituent of the first embodiment of the binder composition can be admixed with:

5–20% fly ash C;
4–10% pozzolan;
1–5% silicic acid;
1–5% potassium or sodium salt, preferably potassium.

The resulting composition has a molar ratio of $SiO_2$ to $Al_2O_3$ in the range of about 7.4 to about 14.3, of $M_2O$ to $SiO_2$ in the range of about 0.05 to about 0.10, of $H_2O$ to $M_2O$ in the range of about 5.0 to about 9.0 and of $M_2O$ to $Al_2O_3$ in the range of about 0.25 to about 0.45.

The composition of this example is useful as a construction material, either in substitution for or in conjunction with Portland cement.

The composition of this example is relatively more expensive than the previous examples. Fly ash C currently is more expensive than flay ash F, however, fly ash C has better quality.

The pozzolan replaces anhydrous aluminum silicate as a source of $Al_2O_3$.

EXAMPLE 5

Between 40 and 60%, by weight, of the first embodiment of the binder composition can be mixed with:

4–10% pozzolan;
4–10% nephelene cyanite;
1–5% hydrous aluminum silicate;
1–5% hydrous sodium hydroxide;
1–5% silicic acid;
1–5% potassium or sodium salt, either separately or in combination.

The resulting composition has a molar ratio of $SiO_2$ to $Al_2O_3$ in the range of about 5.2 to about 9.0, of $M_2O$ to $SiO_2$ in the range of about 0.50 to about 2.00, of $H_2O$ to $M_2O$ in the range of about 5.0 to about 9.0 and of $M_2O$ to $Al_2O_3$ in the range of about 1.75 to about 3.50.

In this example, the nephelene cyanite and hydrous aluminum silicate may be replaced by 5–10% anhydrous aluminum silicate. However, nephelene cyanite and hydrous aluminum silicate is preferred since it is a waste material and therefore relatively inexpensive.

The binder composition of this example is particularly useful in the steel industry. Industrial waste, such as coke breeze, mill scale, flue dust and other revert materials can be briquetted for reuse in the steel manufacturing process. Reclamation of the revert materials reduces the need to landfill the industrial waste, as well as recovering valuable iron units.

In the past, the revert material has been mixed with binders such as starch, lime, tar, cement, molasses. The agglomerated material is then briquetted for recycling. However, incineration of the organic binders generates toxins such as phenols (carbolic acid). The Environmental Protection Agency in the United States has recently banned the use of organic binders for use in recycling revert materials.

The binder composition of this example is mixed with the revert waste material. The binder composition content of the binder-waste material should be about 13½% to about 17½%, when feeding cold binder stock. If the binder stock is heated, less binder may be used to achieve satisfactory results. If the binder content is greater than 14%, the binder-waste material should be dried before compressing into a briquette.

The waste material can comprise by weight up to about 55% coke breeze and furnace sludge, about 10% flue dust and about 20% recycled mill scale.

The binder-waste material is then compressed into a briquette using a conventional briquetting machine. The briquette is compressed at a pressure of between 1800 and 2600 psi, preferably between 2100 and 2600 psi, using a wheel speed of between 4–6 RPM. The briquette is then re-introduced into the furnace for incineration.

Using iron ore pellets of virgin materials in a blast furnace, the recovery of iron content is about 85%. Using the recycling techniques of the prior art, the recovery is about 40%. Using the briquettes of the present invention, recovery of iron may be as high as 78%.

It can be readily understood that the process described herein is also applicable to other processing of base metals, including smelting of lead, nickel and zinc.

Second Embodiment

The binder composition of a second embodiment includes a composition by weight of:

5–20% fumed silica;
40–60% anhydrous aluminum silicate;
1–10% silicic acid;
1–10% either potassium or sodium salt, or combinations thereof.

When using potassium salt, the resulting composition has a molar ratio of $SiO_2$ to $Al_2O_3$ in the range of about 0.24 to about 2.2 of $M_2O$ to $SiO_2$ in the range of about 0.04 to about 0.10, of $H_2O$ to $M_2O$ in the range of about 5.0 to about 12.5 and of $M_2O$ to $Al_2O_3$ in the range of about 0.12 to about 0.30.

When using sodium salt, the resulting composition has a molar ratio of $SiO_2$ to $Al_2O_3$ in the range of about 2.5 to about 3.4, of $M_2O$ to $SiO_2$ in the range of about 0.04 to 0.15, of $H_2O$ to $M_2O$ in the range of about 5.0 to about 9.0 and of $M_2O$ to $Al_2O_3$ in the range of about 0.10 to about 0.40.

Third Embodiment

The binder composition of a third embodiment includes a composition by weight of:

10–20% fumed silica;
40–50% anhydrous aluminum silicate;
and equal parts of
15–25% silicic acid; and
15–25% either potassium or sodium salt, or combinations thereof.

The binder composition of this embodiment is particularly useful in the steel industry.

It is readily understood that each of the examples described herein have applications in recycling, construction and hazardous waste disposal. However, each has been found to have particular applications as a result of the costs and/or the specific characteristics which are required. In general, the inorganic binder of the present invention has been found to be non-shrinking on setting, to have high early strength, high surface hardness (>6 on moh scale) and high compressive strength in comparison to portland cement and even other inorganic binder compositions.

It is now apparent to a person skilled in the art that numerous combinations of binders may be manufactured using the present invention. However, since many other modifications and purposes of this invention become readily apparent to those skilled in the art upon perusal of the foregoing description, it is to be understood that certain changes in style, amounts and components may be effective without a departure from the spirit of the invention and within the scope of the appended claims.

I claim:

1. An inorganic binder composition comprising an admixture of:
    (i) a first constituent comprising sodium dioxide, tri-calcium silicate, di-calcium silicate, tri-calcium aluminate, aluminum oxide, ferric oxide, magnesium oxide, and sulphur tri-oxide; and
    (ii) a second constituent comprising fly ash F and at least one member other than fly ash F, selected from the group consisting of $Al_2O_3$, pozzolan, nepheline syenite, aluminum silicate, sodium hydroxide, silicic acid, potassium salt, sodium salt and mixtures thereof;
    wherein said admixture has a molar ratio of $SiO_2$ to $Al_2O_3$ is in the range of from about 5.2 to about 14.3.

2. The inorganic binder composition defined in claim 1, wherein said composition comprises from 40 to 90% by weight of the first constituent.

3. The inorganic binder composition defined in claim 2, wherein said molar ratio of $SiO_2$ to $Al_2O_3$ is in the range of from about 5.2 to about 7.6.

4. The inorganic binder composition defined in claim 3, wherein the first constituent is present in an amount of from 62 to 90% by weight, and the second constituent comprises 5–20% by weight fly ash F, 4–10% by weight fumed silica and 1–8% by weight $Al_2O_3$.

5. The inorganic binder composition defined in claim 1, wherein said admixture has a molar ratio of $SiO_2$ to $Al_2O_3$ in the range of from about 5.2 to about 8.9, a molar ratio of $M_2O$ to $SiO_2$ in the range of from about 0.07 to about 0.11, a molar ratio of $H_2O$ to $M_2O$ in the range of from about 5.0 to about 10.0 and a molar ratio of $M_2O$ to $Al_2O_3$ in the range of from about 0.30 to about 0.45, where $M_2O$ is selected from the group consisting of $Na_2O$, $K_2O$ and a mixture of $Na_2O$ and $K_2O$.

6. The inorganic binder composition defined in claim 1, wherein said admixture has a molar ratio; of $SiO_2$ to $Al_2O_3$ in the range of about from 7.4 to about 14.3, of $M_2O$ to $SiO_2$ in the range of from about 0.05 to about 0.10, of $H_2O$ to $M_2O$ in the range of from about 5.0 to about 9.0 and of $M_2O$ to $Al_2O_3$ in the range of from about 0.25 to about 0.45, where $M_2O$ is selected from the group consisting of $Na_2O$, $K_2O$ and a mixture of $Na_2O$ and $K_2O$.

7. The inorganic binder composition defined in claim 1, wherein said admixture has a molar ratio of $SiO_2$ to $Al_2O_3$ in the range of from about 5.2 to about 9.0, of $M_2O$ to $SiO_2$ in the range of from about 0.50 to about 2.00, of $H_2O$ to $M_2O$ in the range of from about 5.0 to about 9.0 and of $M_2O$ to $Al_2O_3$ in the range of from about 1.75 to about 3.50, where $M_2O$ is selected from the group consisting of $Na_2O$, $K_2O$ and a mixture of $Na_2O$ and $K_2O$.

8. A constituent of an inorganic binder composition comprising about 20% by weight sodium dioxide, about 60% by weight tri-calcium silicate, about 10% by weight di-calcium silicate, about 6% by weight tri-calcium aluminate, about 1% by weight aluminum oxide, about 1% by weight ferric oxide, about 1% by weight magnesium oxide and about 1% by weight sulphur tri-oxide.

9. An inorganic binder composition comprising an admixture of:
   (i) a first constituent comprising fumed silica, anhydrous aluminum silicate and silicic acid; and
   (ii) a second constituent selected from a group consisting of: potassium salt and sodium salt.

10. The inorganic binder composition defined in claim 9, wherein said second constituent is potassium salt and the admixture has a molar ratio of $SiO_2$ to $Al_2O_3$ in the range of from about 0.24 to about 2.2, a molar ratio of $M_2O$ to $SiO_2$ in the range of from about 0.04 to about 0.10, a molar ratio of $H_2O$ to $M_2O$ in the range of from about 5.0 to about 12.5 and a molar ratio of $M_2O$ to $Al_2O_3$ in the range of from about 0.12 to about 0.30, where $M_2O$ is selected from the group consisting of $Na_2O$, $K_2O$ and a mixture of $Na_2O$ and $K_2O$.

11. The inorganic binder composition defined in claim 9, wherein said second constituent is sodium salt and the admixture has a molar ratio of $SiO_2$ to $Al_2O_3$ in the range of from about 2.5 to about 3.4, a molar ratio of $M_2O$ to $SiO_2$ in the range of from about 0.04 to about 0.15, a molar ratio of $H_2O$ to $M_2O$ in the range of from about 5.0 to about 9.0 and a molar ratio of $M_2O$ to $Al_2O_3$ in the range of from about 0.10 to about 0.40, where $M_2O$ is selected from the group consisting of $Na_2O$, $K_2O$ and a mixture of $Na_2O$ and $K_2O$.

12. The inorganic binder composition defined in claim 9, wherein said composition comprises 10–20% by weight fumed silica; 40–50% by weight anhydrous aluminum silicate; and equal parts of 15–25% by weight silicic acid; and 15–25% by weight of potassium salt, sodium salt, and mixtures thereof.

13. The inorganic binder composition defined in claim 1, wherein the pozzolan comprises fly ash C.

14. The inorganic binder composition defined in claim 1, wherein the pozzolan comprises fumed silica.

15. The inorganic binder composition defined in claim 1, wherein the pozzolan comprises slag.

* * * * *